US010928598B2

(12) United States Patent
Yanagisawa

(10) Patent No.: US 10,928,598 B2
(45) Date of Patent: Feb. 23, 2021

(54) OPTICAL WAVEGUIDE MOUNTING SUBSTRATE AND OPTICAL COMMUNICATION DEVICE

(71) Applicant: SHINKO ELECTRIC INDUSTRIES CO., LTD., Nagano (JP)

(72) Inventor: Kenji Yanagisawa, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 0 days.

(21) Appl. No.: 16/679,721

(22) Filed: Nov. 11, 2019

(65) Prior Publication Data
US 2020/0150360 A1    May 14, 2020

(30) Foreign Application Priority Data
Nov. 14, 2018 (JP) .............................. JP2018-213628

(51) Int. Cl.
G02B 6/42 (2006.01)
G02B 6/43 (2006.01)
G02B 6/122 (2006.01)
G02B 6/12 (2006.01)
G02B 6/132 (2006.01)
G02B 6/138 (2006.01)

(52) U.S. Cl.
CPC ........... *G02B 6/4214* (2013.01); *G02B 6/122* (2013.01); *G02B 6/132* (2013.01); *G02B 6/138* (2013.01); *G02B 6/43* (2013.01); *G02B 2006/12035* (2013.01)

(58) Field of Classification Search
CPC ................................ G02B 6/132; G02B 6/138
See application file for complete search history.

(56) References Cited

U.S. PATENT DOCUMENTS

| 6,438,281 | B1* | 8/2002 | Tsukamoto | ............. G02B 6/138 385/14 |
| 7,596,289 | B2* | 9/2009 | Yamamoto | ......... G02B 6/12002 385/14 |
| 8,923,669 | B2* | 12/2014 | Yamamoto | ....... B29D 11/00663 385/129 |
| 9,989,713 | B1* | 6/2018 | Cyr | ...................... G02B 6/4238 |

(Continued)

FOREIGN PATENT DOCUMENTS

| JP | 2001-166167 | 6/2001 |
| JP | 2012-128153 | 7/2012 |
| JP | 2016/126039 | 7/2016 |

*Primary Examiner* — Sung H Pak
(74) *Attorney, Agent, or Firm* — Rankin, Hill & Clark LLP

(57) ABSTRACT

An optical waveguide mounting substrate includes a wiring substrate, and an optical waveguide mounted on the wiring substrate with an adhesive layer being interposed therebetween. The optical waveguide includes a first cladding layer, a core layer formed on a surface of the first cladding layer facing toward the wiring substrate, and a second cladding layer formed on the surface of the first cladding layer facing toward the wiring substrate so as to cover a periphery of the core layer. An opening is opened on the second cladding layer-side, penetrating the second cladding layer and the core layer, and closed on the first cladding layer-side, and a metal film is provided on an end face of the core layer in the opening. The second cladding layer faces the wiring substrate via the adhesive layer. A part of the adhesive layer is filled in the opening.

5 Claims, 15 Drawing Sheets

(56) References Cited

U.S. PATENT DOCUMENTS

| | | | |
|---|---|---|---|
| 10,168,495 B1* | 1/2019 | Sagara | G02B 6/122 |
| 2006/0110114 A1* | 5/2006 | Yanagisawa | G02B 6/136 |
| | | | 385/129 |
| 2008/0279518 A1* | 11/2008 | Yonekura | H05K 1/0274 |
| | | | 385/127 |
| 2012/0155822 A1 | 6/2012 | Yanagisawa et al. | |
| 2016/0187582 A1* | 6/2016 | Yanagisawa | G02B 6/4214 |
| | | | 264/1.24 |

* cited by examiner

OPTICAL WAVEGUIDE MOUNTING SUBSTRATE AND OPTICAL COMMUNICATION DEVICE

CROSS-REFERENCE TO RELATED APPLICATIONS

This application is based upon and claims the benefit of priority from prior Japanese patent application No. 2018-213628, filed on Nov. 14, 2018, the entire contents of which are incorporated herein by reference.

TECHNICAL FIELD

The present disclosure relates to an optical waveguide mounting substrate and an optical communication device.

BACKGROUND ART

An optical waveguide device having an optical path conversion mirror formed using a laser processing device is suggested. The laser processing device is used, so that it is possible to easily form the optical path conversion mirror.
[PTL 1] JP-A-2016-126039
[PTL 2] JP-A-2012-128153
[PTL 3] JP-A-2001-166167

SUMMARY OF INVENTION

However, in the optical waveguide device manufactured by the related-art method of using the laser processing device, a reflecting property on the optical path conversion mirror may change.

Aspect of non-limiting embodiments of the present disclosure relates to provide an optical waveguide mounting substrate and an optical communication device capable of obtaining a stable reflecting property.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

An optical waveguide mounting substrate according to non-limiting embodiment of the present disclosure comprises:
a wiring substrate; and
an optical waveguide mounted on the wiring substrate with an adhesive layer being interposed therebetween,
wherein the optical waveguide comprises:
a first cladding layer,
a core layer formed on a surface of the first cladding layer facing toward the wiring substrate, and
a second cladding layer formed on the surface of the first cladding layer facing toward the wiring substrate so as to cover a periphery of the core layer,
wherein an opening is opened on the second cladding layer-side, penetrating the second cladding layer and the core layer, and closed on the first cladding layer-side, and a metal film is provided on an end face of the core layer in the opening,
wherein the second cladding layer faces the wiring substrate via the adhesive layer, and
wherein a part of the adhesive layer is filled in the opening.

According to the present disclosure, it is possible to obtain the stable reflecting property.

DESCRIPTION OF EMBODIMENTS

Figure 1:
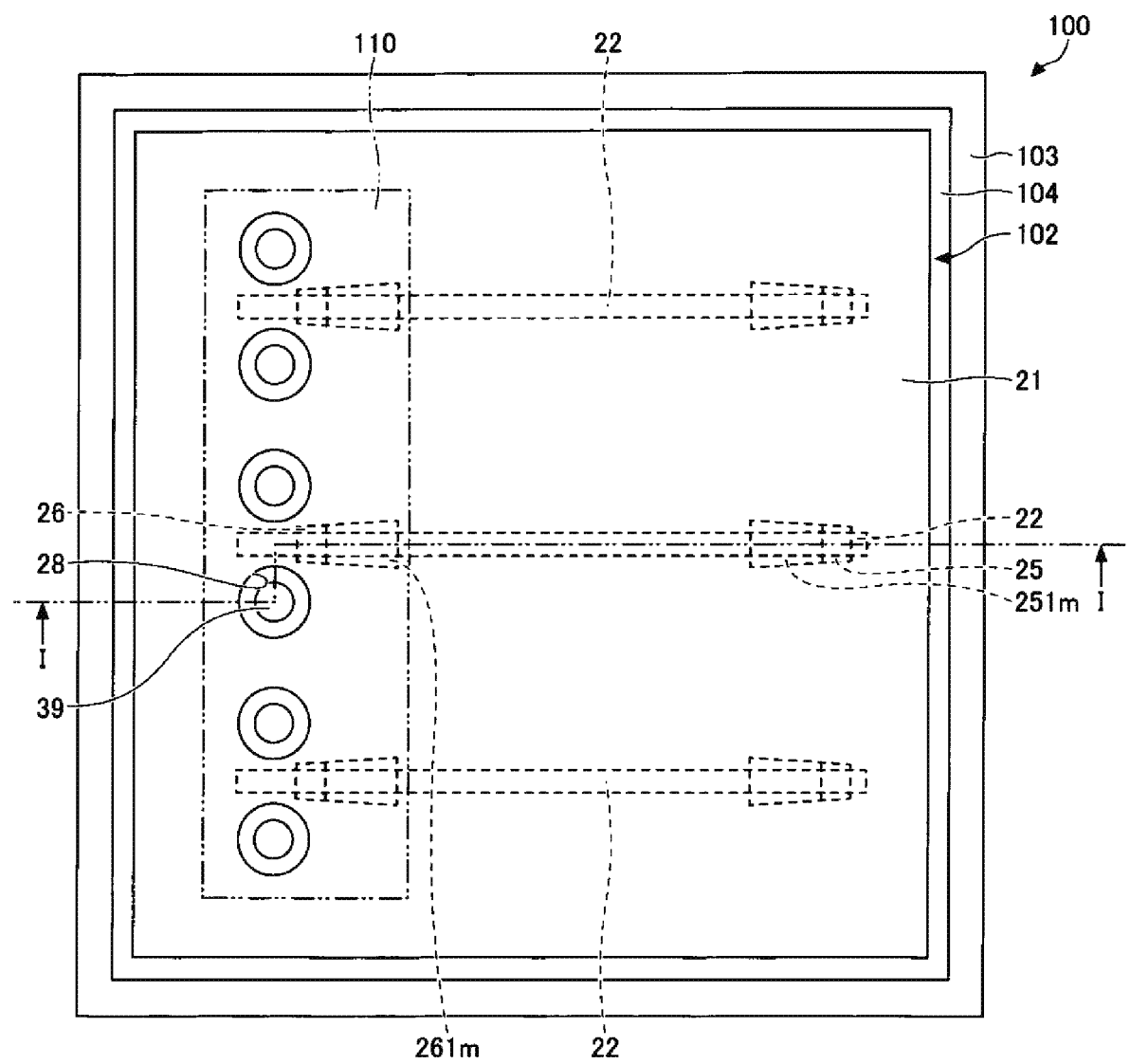
FIG. 1 is a plan view depicting a structure of an optical waveguide mounting substrate in accordance with a first exemplary embodiment.

Hereinbelow, exemplary embodiments will be described in detail with reference to the accompanying drawings. In the meantime, in the specification and drawings, the constitutional elements having substantially the same functions and configurations are denoted with the same reference numerals, and the overlapping descriptions thereof may be omitted.

First Exemplary Embodiment

Figure 2:
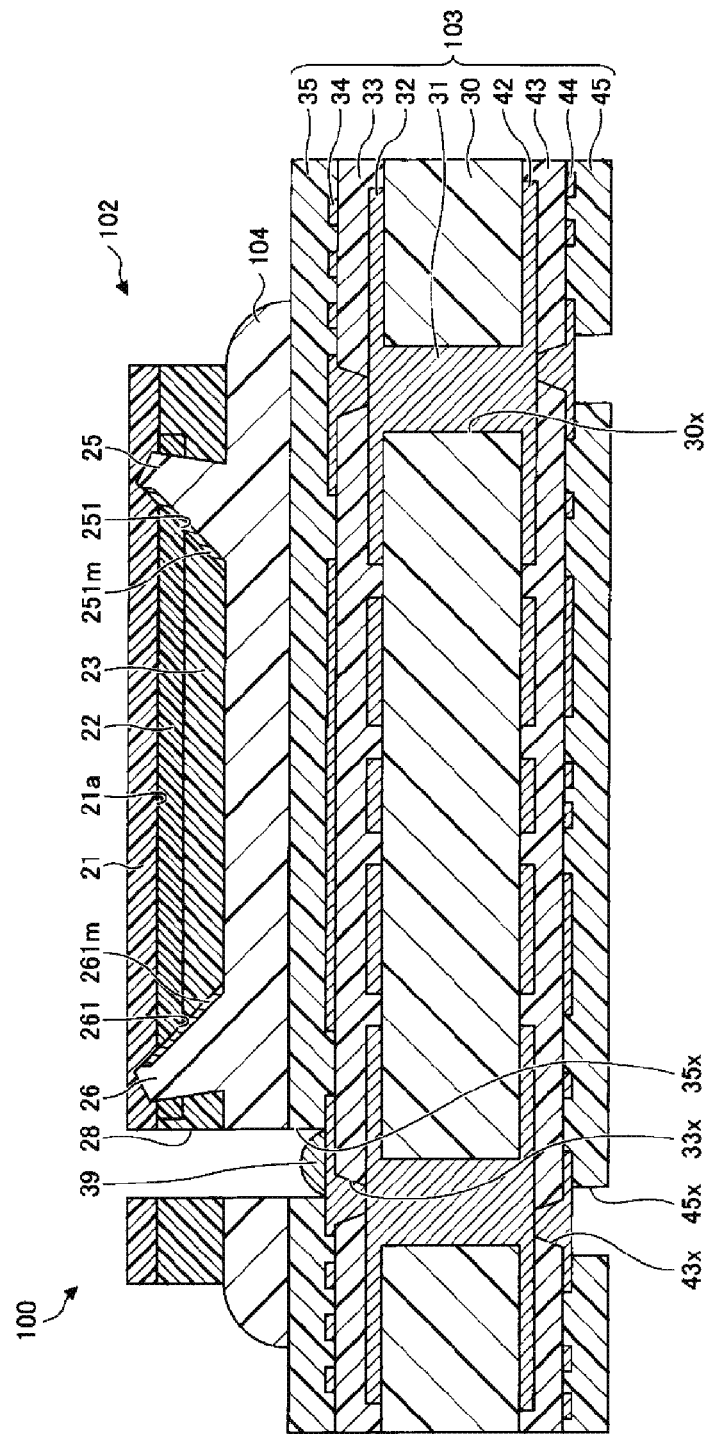
FIG. 2 is a sectional view depicting the structure of the optical waveguide mounting substrate in accordance with the first exemplary embodiment.
Figure 3:
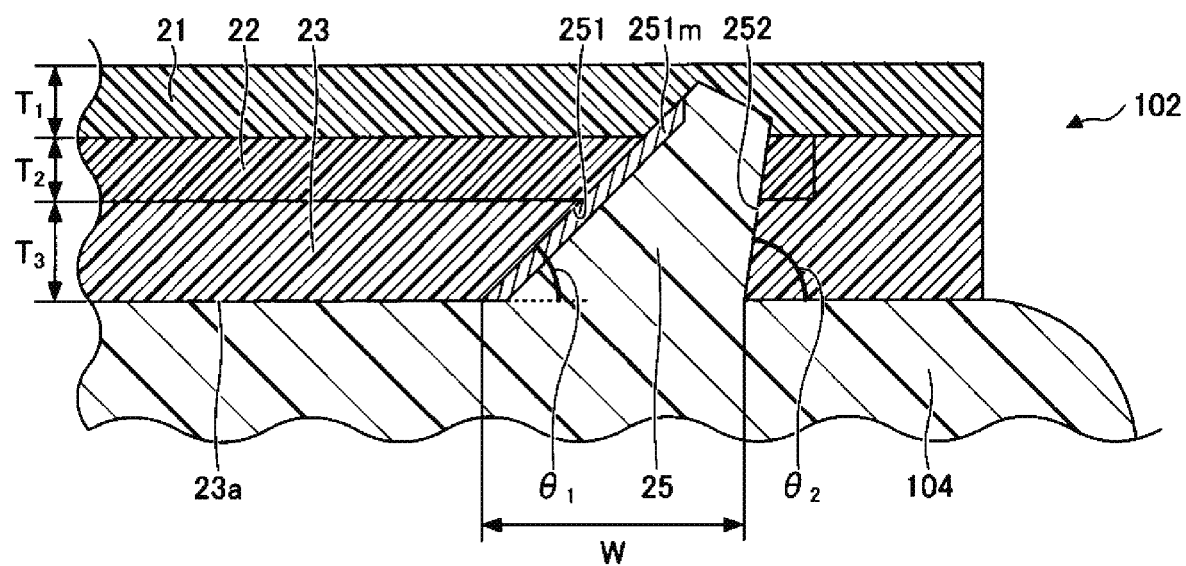
FIG. 3 is a partially enlarged sectional view in the vicinity of an opening in FIG. 2.

A first exemplary embodiment is described. The first exemplary embodiment relates to an optical waveguide mounting substrate.
[Structure of Optical Waveguide Mounting Substrate]
First, a structure of an optical waveguide mounting substrate is described. FIG. 1 is a plan view depicting a structure of an optical waveguide mounting substrate in accordance with the first exemplary embodiment. FIG. 2 is a sectional view depicting the structure of the optical waveguide mounting substrate in accordance with the first exemplary embodiment. FIG. 2 corresponds to a sectional view taken along a line I-I in FIG. 1. FIG. 3 is a partially enlarged sectional view in the vicinity of an opening 25 in FIG. 2.

As shown in FIGS. 1 and 2, an optical waveguide mounting substrate 100 of the first exemplary embodiment includes a wiring substrate 103, and an optical waveguide 102 mounted on the wiring substrate 103 with an adhesive layer 104 being interposed therebetween.

A wiring layer and an insulation layer are stacked on both surfaces of a core substrate 30 of the wiring substrate 103, respectively. Specifically, a wiring layer 32, an insulation layer 33, a wiring layer 34, and a solder resist layer 35 are sequentially stacked on one surface (upper surface) of the core substrate 30 of the wiring substrate 103. Also, a wiring layer 42, an insulation layer 43, a wiring layer 44, and a solder resist layer 45 are sequentially stacked on the other surface (lower surface) of the core substrate 30.

As the core substrate 30, for example, a so-called glass epoxy substrate in which an insulating resin such as an epoxy-based resin is impregnated in glass cloth, and the like may be used. As the core substrate 30, a substrate in which an epoxy-based resin, a polyimide-based resin or the like is impregnated in woven fabric or non-woven fabric of glass fiber, carbon fiber, aramid fiber or the like, and the like may also be used. A thickness of the core substrate 30 may be set to about 60 μm to 400 μm, for example. The core substrate 30 is formed with through-holes 30x penetrating the core substrate 30 in a thickness direction. A planar shape of the through-hole 30x is circular, for example.

The wiring layer 32 is formed on one surface of the core substrate 30. Also, the wiring layer 42 is formed on the other surface of the core substrate 30. The wiring layer 32 and the wiring layer 42 are electrically connected by through-wirings 31 formed in the through-holes 30x. The wiring layers 32 and 42 are respectively patterned into a predetermined planar shape. For the wiring layers 32 and 42 and the through-wiring 31, copper (Cu) or the like may be used, for example. A thickness of each of the wiring layers 32 and 42 may be set to about 10 μm to 30 μm, for example. In the meantime, the wiring layer 32, the wiring layer 42 and the through-wirings 31 may be integrally formed.

The insulation layer 33 is formed on one surface of the core substrate 30 so as to cover the wiring layer 32. As a material of the insulation layer 33, for example, an insulating resin of which a main component is an epoxy-based resin or a polyimide-based resin, and the like may be used. A thickness of the insulation layer 33 may be set to about 30 μm to 40 μm, for example. The insulation layer 33 may contain filler such as silica ($SiO_2$).

The wiring layer 34 is formed on one side of the insulation layer 33. The wiring layer 34 includes via wirings filled in via holes 33x penetrating the insulation layer 33 and formed to expose one surface of the wiring layer 32, and a wiring pattern formed on one surface of the insulation layer 33. The wiring layer 34 is electrically connected to the wiring layer 32. The via hole 33x may be formed as a concave portion having an inverted conical shape of which a diameter of an opening opened to the solder resist layer 35-side is larger than a diameter of a bottom surface of an opening formed by one surface of the wiring layer 32. A material of the wiring layer 34 and a thickness of the wiring pattern configuring the wiring layer 34 may be made to be the same as the wiring layer 32, for example.

The solder resist layer 35 is an outermost layer formed on one side of the wiring substrate 103, and is formed on one surface of the insulation layer 33 so as to cover the wiring layer 34. The solder resist layer 35 may be formed of a photosensitive resin such as an epoxy-based resin and an acryl-based resin, and the like. A thickness of the solder resist layer 35 may be set to about 15 μm to 35 μm, for example.

The solder resist layer 35 has openings 35x, and portions of one surface of the wiring layer 34 are exposed to bottom portions of the openings 35x. A planar shape of the opening 35x may be circular, for example. If necessary, one surface of the wiring layer 34 exposed into the openings 35x may be formed with a metal film or may be subjected to oxidation prevention processing such as OSP (Organic Solderability Preservative) processing. As the metal film, an Au layer, a Ni/Au layer (a metal film having a Ni layer and an Au layer stacked in corresponding order), a Ni/Pd/Au layer (a metal film having a Ni layer, a Pd layer and an Au layer stacked in corresponding order), and the like may be exemplified.

The insulation layer 43 is formed on the other surface of the core substrate 30 so as to cover the wiring layer 42. A material and a thickness of the insulation layer 43 may be made to be the same as the insulation layer 33, for example. The insulation layer 43 may contain filler such as silica ($SiO_2$). The wiring layer 44 is formed on the other side of the insulation layer 43. The wiring layer 44 includes via wirings filled in via holes 43x penetrating the insulation layer 43 and formed to expose the other surface of the wiring layer 42, and a wiring pattern formed on the other surface of the insulation layer 43. The wiring layer 44 is electrically connected to the wiring layer 42. The via hole 43x may be formed as a concave portion having an inverted conical shape of which a diameter of an opening opened to the solder resist layer 45-side is larger than a diameter of a bottom surface of an opening formed by the other surface of the wiring layer 42. A material and a thickness of the wiring layer 44 may be made to be the same as the wiring layer 32, for example.

The solder resist layer 45 is an outermost layer on the other side of the wiring substrate 103, and is formed on the other surface of the insulation layer 43 so as to cover the wiring layer 44. A material and a thickness of the solder resist layer 45 may be made to be the same as the solder resist layer 35, for example. The solder resist layer 45 has openings 45x, and portions of the other surface of the wiring layer 44 are exposed into the openings 45x. A planar shape of the opening 45x may be circular, for example. The wiring layer 44 exposed into the openings 45x may be used as a pad for electrical connection with a mounting substrate (not shown) such as a motherboard. If necessary, the other surface of the wiring layer 44 exposed into the openings 45x may be formed with the above-described metal film or may be subjected to oxidation prevention processing such as OSP processing.

On the solder resist layer 35 of the wiring substrate 103, the optical waveguide 102 is mounted via the adhesive layer 104.

The optical waveguide 102 includes a first cladding layer 21, a core layer 22, a second cladding layer 23, openings 25 and 26, and metal films 251m and 261m.

The first cladding layer 21 may be formed of polymer such as a polyimide-based resin, an acryl-based resin, an epoxy-based resin, a polyolefin-based resin, a polynorbornene-based resin, or the like, for example. A thickness $T_1$ of the first cladding layer 21 may be set to about 10 μm to 30 μm, for example. The first cladding layer 21 is arranged substantially in parallel with the wiring substrate 103, above the wiring substrate 103.

The core layers 22 are selectively formed on a surface 21a of the first cladding layer 21 facing toward the wiring substrate 103. In the example of FIG. 1, three elongated core layers 22 are apposed on one surface 21a of the first cladding layer 21. This is just exemplary. That is, one, two or four or more core layers 22 may be formed. A pitch of the apposed core layers 22 may be set to about 200 μm to 300 μm, for example. The core layer 22 may be formed of the same material as the first cladding layer 21. A thickness $T_2$ of the core layer 22 may be set to 15 μm to 35 μm, for example. A sectional shape of the core layer 22 in a width direction may be a square, for example.

The second cladding layer 23 is formed on one surface 21a of the first cladding layer 21 so as to cover peripheries of the core layers 22. The second cladding layer 23 may be formed of the same material as the first cladding layer 21. A thickness $T_3$ of the second cladding layer 23 may be set to about 10 μm to 30 μm, for example. In the meantime, the thickness $T_3$ of the second cladding layer 23 of the present disclosure indicates a thickness of a part overlapping the core layer 22, as seen from above, i.e., a part closer to the wiring substrate 103 than the core layer 22.

As described above, the first cladding layer 21, the core layer 22, and the second cladding layer 23 may be formed of the same material. A refractive index of the core layer 22 is higher than refractive indexes of the first cladding layer 21 and the second cladding layer 23. When an additive for refractive index control such as Ge is added to the core layer 22, it is possible to make the refractive index of the core layer 22 higher than the refractive indexes of the first cladding layer 21 and the second cladding layer 23. The refractive indexes of the first cladding layer 21 and the second cladding layer 23 may be set to 1.5, and the refractive index of the core layer 22 may be set to 1.6, for example.

The optical waveguide 102 is formed with the openings 25 and 26 opened on the second cladding layer 23-side, penetrating the second cladding layer 23 and the core layer 22, and closed on the first cladding layer 21-side. A width W of each of the openings 25 and 26 on the opened side may be set to be greater than 35 μm and smaller than 105 μm, for example.

As shown in FIG. 3, the opening 25 may be formed to have a wedge-shaped section of which a width gradually decreases from the second cladding layer 23 toward the core layer 22. The opening 25 has a first inclined surface 251 and a second inclined surface 252 ranging from the opened side to the closed side, and the first inclined surface 251 and the second inclined surface 252 substantially face each other.

An angle between a surface 23a of the second cladding layer 23 facing toward the wiring substrate 103 and the first inclined surface 251 is denoted as $\theta_1$, and an angle between the surface 23a of the second cladding layer 23 and the second inclined surface 252 is denoted as $\theta_2$. For example, the angle $\theta_1$ is 45°±5°, and the angle $\theta_2$ is 59°±5°. An absolute value of a difference between the angle $\theta_1$ and the angle $\theta_2$ is, for example, 14±1°.

Although not shown in detail, the opening 26 has a plane-symmetrical shape to the opening 25 with respect to a section perpendicular to an extension direction of the core layer 22. That is, the opening 26 may also be formed to have a wedge-shaped section of which a width gradually decreases from the second cladding layer 23 toward the core layer 22. The opening 26 has a first inclined surface 261 and a second inclined surface 262 ranging from the opened side to the closed side, and the first inclined surface 261 and the second inclined surface 262 substantially face each other. Therefore, the values of the angle $\theta_1$ and the angle $\theta_2$ are the same as the opening 25.

In the meantime, in the present disclosure, a shape where a wedge angle (absolute value of the difference between the angle $\theta_1$ and the angle $\theta_2$) is equal to or smaller than 40° is referred to as a wedge-shaped section. That is, the isosceles right angle-shaped section (the wedge angle is 45°) is not included in the wedge-shaped section of the present disclosure.

In the opening 25, the metal film 251m is formed on the first inclined surface 251. The metal film 251m is formed to cover at least the core layer 22 at the first inclined surface 251. That is, the metal film 251m is provided on at least one end face of the core layer 22. An interface between the core layer 22 and the metal film 251m is a reflection surface on which a propagation direction of incident light is to be converted. An end face of the core layer 22 exposed into the opening 25 is inclined in a direction in which a surface of the metal film 251m in contact with the core layer 22 faces toward an opposite side to the wiring substrate 103. The metal film 251m may cover the second cladding layer 23 at the first inclined surface 251, in addition to the core layer 22, and may further cover the first cladding layer 21. The metal film 251m is a gold (Au) film having a thickness of 0.2 μm to 0.5 μm, for example.

In the opening 26, the metal film 261m is formed on the first inclined surface 261. The metal film 261m is formed to cover at least the core layer 22 at the first inclined surface 261. That is, the metal film 261m is provided on at least the other end face of the core layer 22. An interface between the core layer 22 and the metal film 261m is a reflection surface on which a propagation direction of incident light is to be converted. An end face of the core layer 22 exposed into the opening 25 is inclined in a direction in which a surface of the metal film 261m in contact with the core layer 22 faces toward an opposite side to the wiring substrate 103. The metal film 261m may cover the second cladding layer 23 at the first inclined surface 261, in addition to the core layer 22, and may further cover the first cladding layer 21. The metal film 261m is a gold (Au) film having a thickness of 0.2 μm to 0.5 μm, for example.

The thickness $T_2$ of the core layer 22, the thickness $T_3$ of the second cladding layer 23 and the width W of each of the openings 25 and 26 on the opened side preferably satisfy a following equation (1). When the equation (1) is satisfied, the portions on which the metal films 251m and 261m are formed in the openings 25 and 26 can be easily made to be within a range in which the first inclined surfaces 251 and 261 overlap the area of the ends at the opened side of the openings 25 and 26, as seen from above, for example.

$$T_2 + T_3 < W \times \tan \theta_1 \quad (1)$$

Also, the thickness $T_1$ of the first cladding layer 21, the thickness $T_2$ of the core layer 22, the thickness $T_3$ of the second cladding layer 23 and the width W of each of the openings 25 and 26 on the opened side preferably satisfy a following equation (2). When the equation (2) is satisfied, the closed side of each of the openings 25 and 26 can be laid in the first cladding layer 21.

$$W \times \tan \theta_1 < T_1 + T_2 + T_3 \quad (2)$$

The second cladding layer 23 is formed to face the solder resist layer 35 of the wiring substrate 103 via the adhesive layer 104. Also, a part of the adhesive layer 104 is filled in the openings 25 and 26. The adhesive layer 104 may be formed of the same material as the first cladding layer 21 and the second cladding layer 23.

The optical waveguide 102 and the adhesive layer 104 are formed with openings 28 communicating with the opening 35x of the solder resist layer 35. The wiring layer 34 exposed into the opening 35x and the opening 28 to communicate with each other is formed thereon with external connection terminals 39. The external connection terminal 39 is a solder bump, for example. As a material of the solder bump, for example, an alloy including Pb, an alloy of Sn and Cu, an alloy of Sn and Ag, an alloy of Sn, Ag and Cu, and the like may be used. The external connection terminal 39 is a terminal to be electrically connected to a light-emitting element or a light-receiving element.

In the optical waveguide mounting substrate 100 configured as described above, the interface between the core layer 22 and the metal film 251m and the interface between the core layer 22 and the metal film 261m function as reflection surfaces on which the propagation direction of incident light is to be converted, as described above, and the light propagates in the core layer 22 between the two reflection surfaces. Also, the openings 25 and 26 are filled with the adhesive layer 104. Therefore, according to the first exemplary embodiment, it is possible to obtain a stable reflecting property while suppressing foreign matters from adhering to the reflection surfaces.

Although described in detail in a second exemplary embodiment, the light-emitting element 110 is mounted above the optical waveguide mounting substrate 100 with overlapping the three metal films 261m and the three core layers 22, as seen from above, for example, as shown in FIG. 1.

[Manufacturing Method of Optical Waveguide Mounting Substrate]

Subsequently, a manufacturing method of the optical waveguide mounting substrate 100 in accordance with the first exemplary embodiment is described. In the manufacturing method, the optical waveguide 105 having a support member including the optical waveguide 102, and the wiring substrate 103 are individually prepared, the optical waveguide 105 having a support member is mounted on the wiring substrate 103 via the adhesive layer 104, and the support member of the optical waveguide 105 having a support member is removed.

Here, a manufacturing method of the optical waveguide 105 having a support member is described. FIGS. 4A to 5B are sectional views depicting a manufacturing method of the optical waveguide 105 having a support member.

Figure 4A:
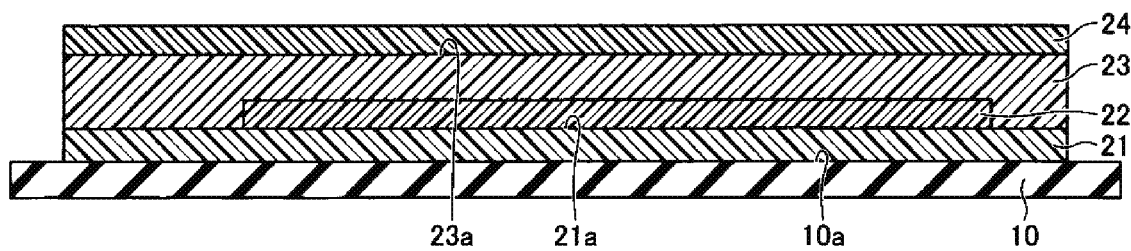
FIGS. 4A and 4B are sectional views depicting a manufacturing method of an optical waveguide having a support member (1 thereof).

First, as shown in FIG. 4A, a support member 10 is prepared, and the first cladding layer 21 is formed on one surface 10a of the support member 10. The support member 10 is a base member for forming the optical waveguide 102, and may be formed by a resin substrate made of polycarbonate or the like. The support member 10 may be formed by a glass substrate, a silicon substrate or the like, too. A thickness of the support member 10 may be set to about 200 μm to 500 μm, for example. The first cladding layer 21 may be formed by applying a liquid or paste resin material to one surface 10a of the support member 10, irradiating the material with ultraviolet, and heating and curing the same, for example. Instead of coating the liquid or paste resin material, a film-shaped resin material may be laminated. The material and thickness of the first cladding layer 21 are as described above.

Then, as shown in FIG. 4A, the core layer 22 is formed on the other surface 21a of the first cladding layer 21, which is opposite to the support member 10. The core layer 22 may be formed by applying a liquid or paste resin material to the entire surface 21a of the first cladding layer 21, irradiating the material with ultraviolet, heating and curing the material, and patterning the same with a photolithography method, for example. Instead of coating the liquid or paste resin material, a film-shaped resin material may be laminated. The material and thickness of the core layer 22 are as described above.

Then, as shown in FIG. 4A, the second cladding layer 23 is formed on the surface 21a of the first cladding layer 21 so as to cover the core layer 22. Thereby, a periphery of the core layer 22 is covered with the first cladding layer 21 and the second cladding layer 23. The second cladding layer 23 may be formed by the same method as the first cladding layer 21. The material and thickness of the second cladding layer 23 are as described above.

Subsequently, as shown in FIG. 4A, s protective film 24 is bonded to a surface 23a of the second cladding layer 23, which is opposite to the first cladding layer 21. As the protective film 24, a film of polyethylene terephthalate (PET) having a thickness of about 20 μm to 30 μm is used, for example.

Figure 4B:
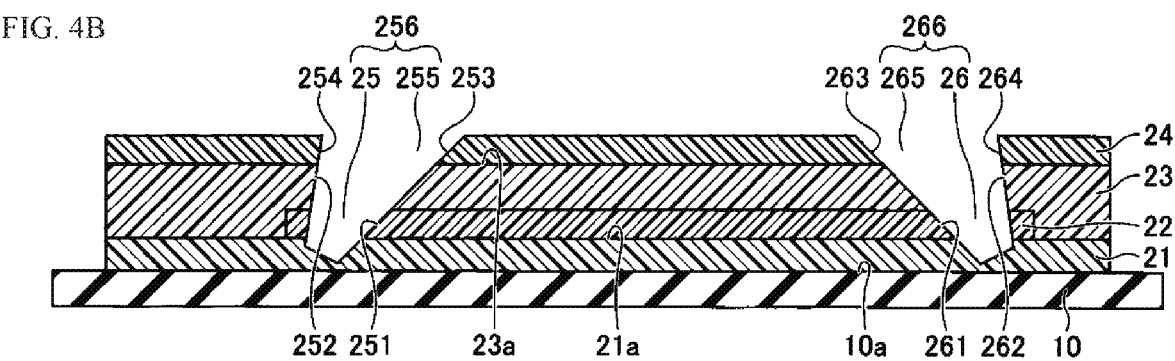

Then, as shown in FIG. 4B, openings 256 and 266 opened on the protective film 24-side, penetrating the protective film 24, the second cladding layer 23 and the core layer 22, and closed on the first cladding layer 21-side are formed. The opening 256 includes the opening 25, and an opening 255 formed in the protective film 24 and communicating with the opening 25. The opening 255 includes a third inclined surface 253 connecting to the first inclined surface 251 to be flush with the first inclined surface 251, and a fourth inclined surface 254 connecting to the second inclined surface 252 to be flush with the second inclined surface 252. The opening 266 includes the opening 26, and an opening 265 formed in the protective film 24 and communicating with the opening 26. The opening 265 includes a third inclined surface 263 connecting to the first inclined surface 261 to be flush with the first inclined surface 261, and a fourth inclined surface 264 connecting to the second inclined surface 262 to be flush with the second inclined surface 262.

The opening 256 is formed so that the first inclined surface 251 of the core layer 22 is exposed from the protective film 24, as seen from above, and the opening 266 is formed so that the first inclined surface 261 of the core layer 22 is exposed from the protective film 24, as seen from above. That is, the opening 256 is formed so that an opening end of the fourth inclined surface 254 is not overlapped with the first inclined surface 251 of the core layer 22, as seen from above, and the opening 266 is formed so that an opening end of the fourth inclined surface 264 is not overlapped with the first inclined surface 261 of the core layer 22, as seen from above.

The openings 25 and 26 may be formed by irradiation of laser light. As the laser light, for example, ArF excimer laser (wavelength 193 nm), KrF excimer laser (wavelength 248 nm), XeCl excimer laser (wavelength 308 nm), XeF excimer laser (wavelength 351 nm) and the like may be used. The excimer laser is favorable because it can form one opening by one time irradiation.

In the meantime, when the excimer laser is used, the opening 25 is formed so that an angle between the first inclined surface 251 and the second inclined surface 252 (refer to FIG. 3) is to be about 14°. The opening 26 is also the same. Therefore, when the laser light is irradiated at an angle of about 38° relative to the surface 21a of the first cladding layer 21, the angle $\theta_1$ (refer to FIG. 3) becomes about 45° and the angle $\theta_2$ (refer to FIG. 3) becomes about 59°.

In this way, in the optical waveguide 105 having a support member, the openings 25 and 26 are formed using the excimer laser, so that it is possible to accurately form one opening by one time irradiation.

Figure 5A:
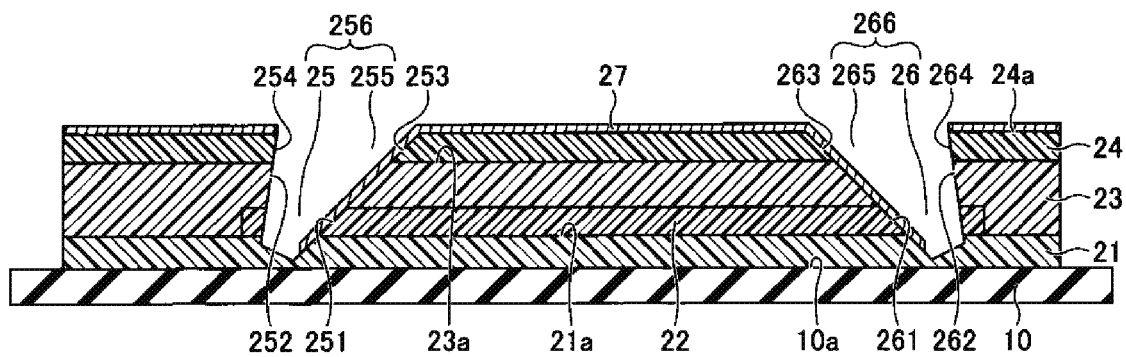
FIGS. 5A and 5B are sectional views depicting the manufacturing method of the optical waveguide having the support member (2 thereof).

After forming the openings 25 and 26, as shown in FIG. 5A, a metal film 27 is formed on an upper surface 24a of the protective film 24, parts of the first inclined surface 251 and the third inclined surface 253 exposed from the protective film 24, as seen from above, and parts of the first inclined surface 261 and the third inclined surface 263 exposed from the protective film 24, as seen from above. The metal film 27 is preferably formed by a vapor deposition method. The metal film 27 may be formed by a sputtering method. However, when formed by the sputtering method, the metal film 27 is formed on unwanted places such as the second inclined surfaces 252 and 262. Therefore, the metal film 27 is preferably formed by the vapor deposition method.

Figure 5B:
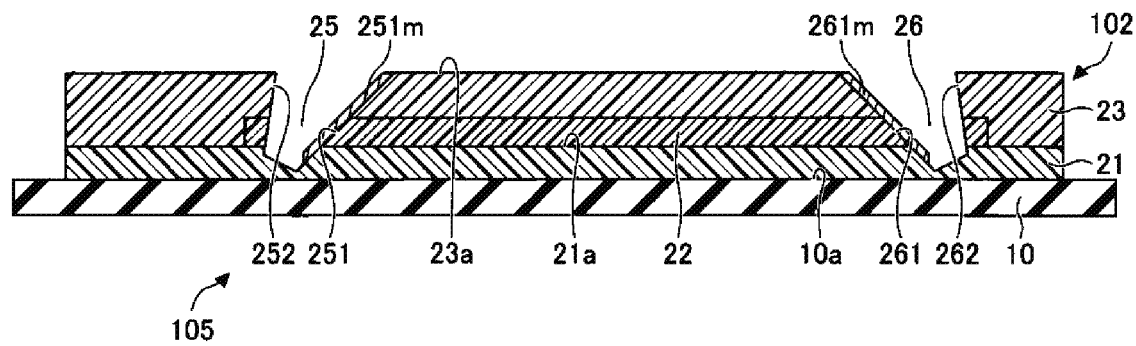

Subsequently, as shown in FIG. 5B, the protective film 24 is peeled off. As the protective film 24 is peeled off, parts, which are formed on the surface of the protective film 24, i.e., the upper surface 24a of the protective film 24, on the third inclined surface 253 and on the third inclined surface 263, of the metal film 27 are removed. As a result, in the opening 25, the metal film 27 remains as the metal film 251m on the first inclined surface 251, and in the opening 26, the metal film 27 remains as the metal film 261m on the first inclined surface 261.

In this way, it is possible to form the optical waveguide 105 having the support member which includes the optical waveguide 102 of which the first cladding layer 21, the core layer 22 and the second cladding layer 23 are sequentially stacked on one surface 10a of the support member 10, and the metal film 251m formed in the opening 25 and the metal film 261m formed in the opening 26.

Subsequently, processes of bonding the optical waveguide 105 having the support member to the wiring substrate 103 and thereafter are described. FIGS. 6 to 13 are sectional views depicting a manufacturing method of the optical waveguide mounting substrate 100.

Figure 6:
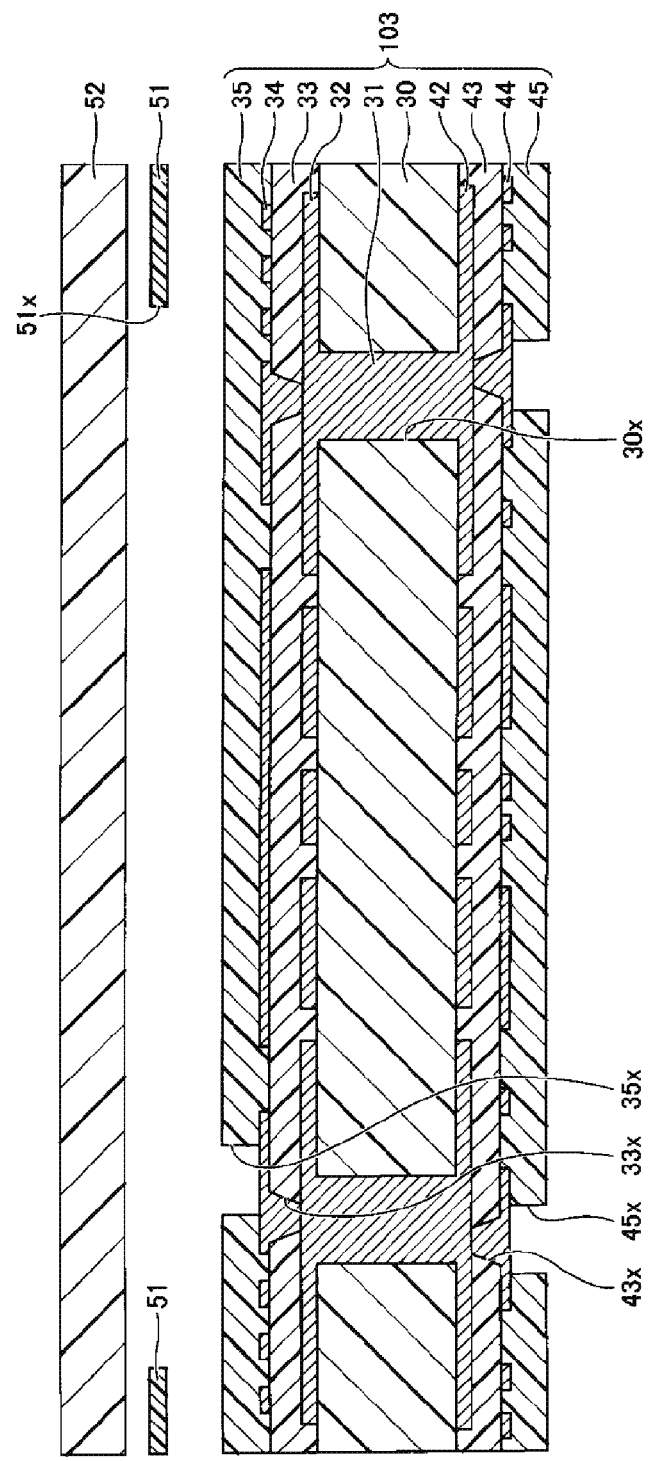
FIG. 6 is a sectional view depicting a manufacturing method of an optical waveguide mounting substrate accordance with the first exemplary embodiment (1 thereof).

As shown in FIG. 6, the wiring substrate 103 is prepared. The wiring substrate 103 may be manufactured using a well-known buildup technology, for example. Then, an adhesive film 52 is arranged above the solder resist layer 35 with a separator 51 being interposed therebetween. As the separator 51, a PET film having a thickness of about 35 μm to 45 μm is used, for example. The separator 51 is formed therein with an opening 51x for exposing a part of the wiring substrate 103 on which the optical waveguide 105 having the support member is to be mounted. The adhesive film 52 will be the adhesive layer 104, and may be formed of the same material as the first cladding layer 21 and the second cladding layer 23. A thickness of the adhesive film 52 may be set to about 25 μm to 45 μm, for example.

Figure 7:
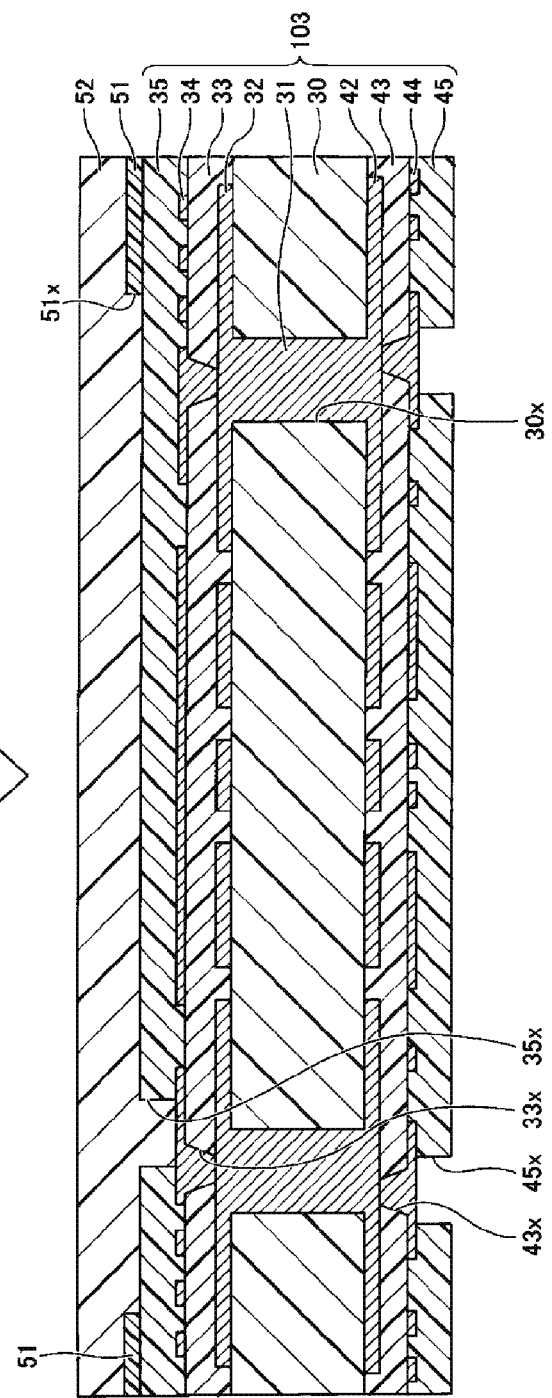
FIG. 7 is a sectional view depicting the manufacturing method of the optical waveguide mounting substrate accordance with the first exemplary embodiment (2 thereof).

Thereafter, as shown in FIG. 7, the adhesive film 52 is bonded to the wiring substrate 103 via the separator 51 by a vacuum laminate method.

Figure 8:
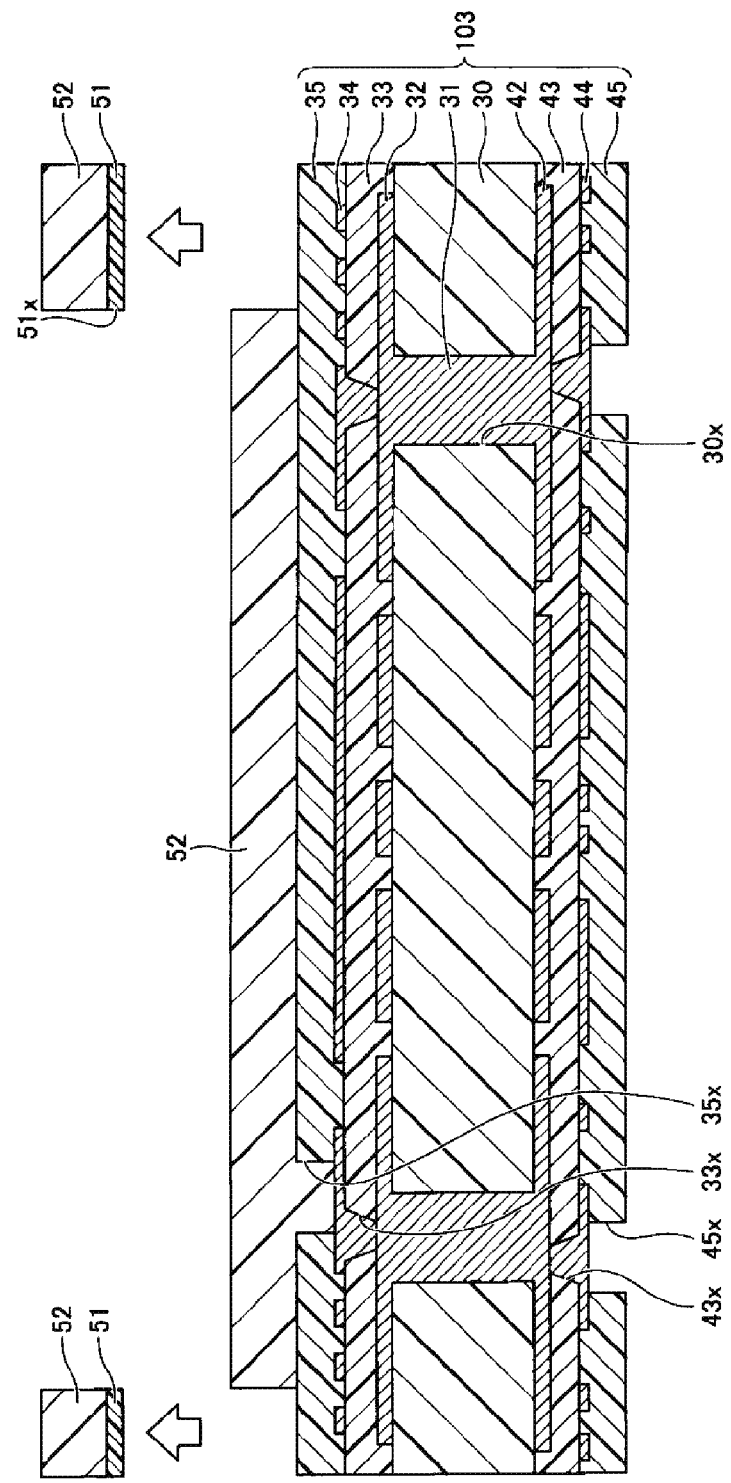
FIG. 8 is a sectional view depicting the manufacturing method of the optical waveguide mounting substrate accordance with the first exemplary embodiment (3 thereof).

Subsequently, as shown in FIG. 8, the separator 51 is peeled off. As the separator 51 is peeled off, a part of the adhesive film 52 located on an upper surface of the separator 51 is removed. As a result, a part of the adhesive film 52 remains on the part of the wiring substrate 103 on which the optical waveguide 105 having the support member is to be mounted.

Figure 9:
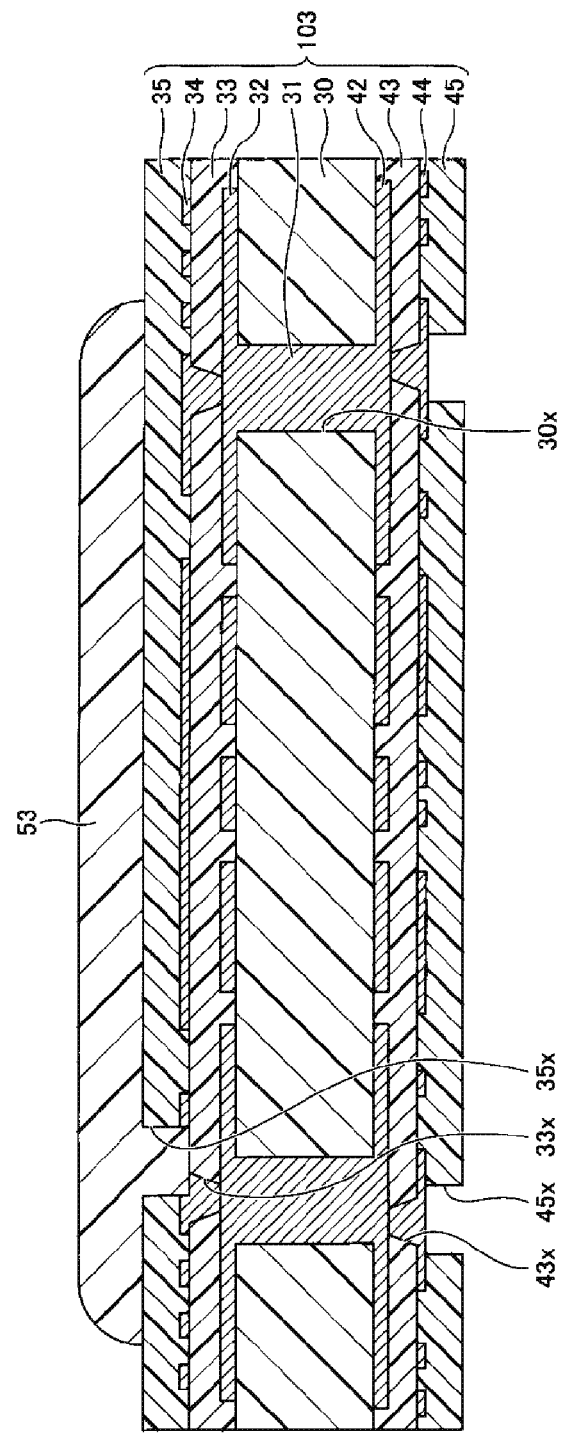
FIG. 9 is a sectional view depicting the manufacturing method of the optical waveguide mounting substrate accordance with the first exemplary embodiment (4 thereof).

Then, as shown in FIG. 9, the adhesive film 52 remaining on the wiring substrate 103 is liquefied by heating, so that a liquefied adhesive 53 is formed. As the heating, oven heating at 140° C. for three minutes may be performed, for example.

Figure 10:
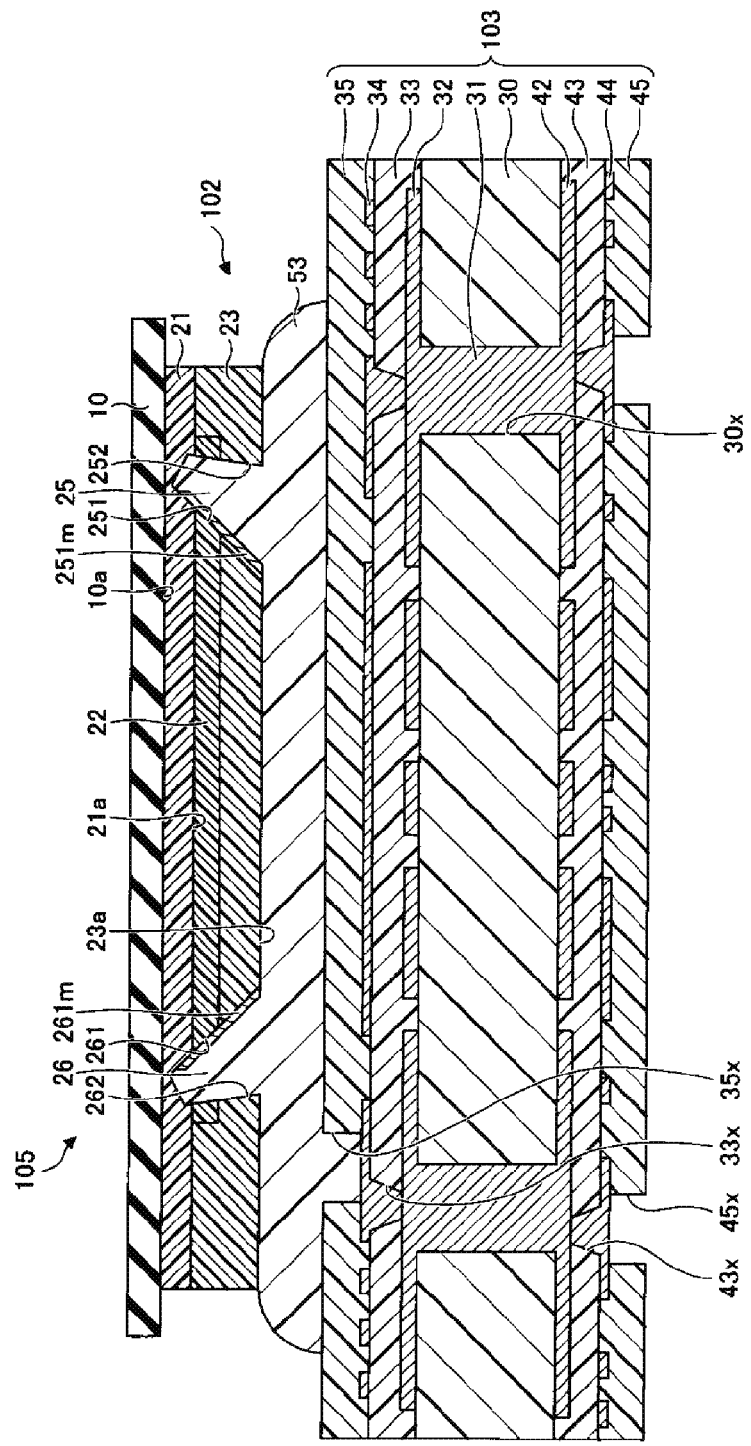
FIG. 10 is a sectional view depicting the manufacturing method of the optical waveguide mounting substrate accordance with the first exemplary embodiment (5 thereof).

Then, as shown in FIG. 10, the second cladding layer 23 is bonded to the wiring substrate 103 via the liquefied adhesive 53 by the vacuum laminate method. At this time, the optical waveguide 105 having the support member is mounted so that the second cladding layer 23 of the optical waveguide 102 faces the solder resist layer 35 via the liquefied adhesive 53. The liquefied adhesive 53 enters the openings 25 and 26 and fills the openings 25 and 26.

Figure 11:
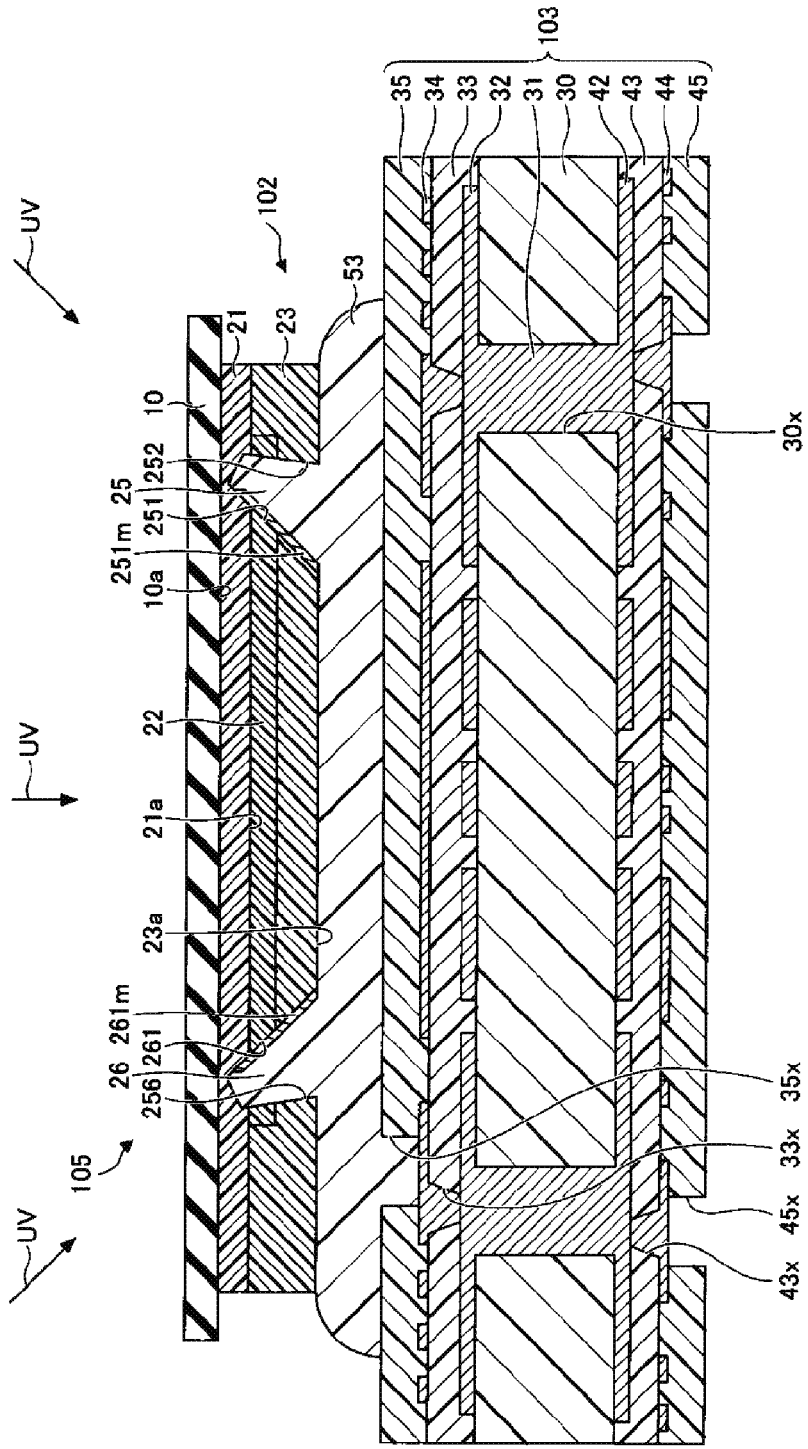
FIG. 11 is a sectional view depicting the manufacturing method of the optical waveguide mounting substrate accordance with the first exemplary embodiment (6 thereof).

Subsequently, as shown in FIG. 11, the liquefied adhesive 53 is irradiated with ultraviolet UV through the support member 10, so that the liquefied adhesive 53 is temporarily cured.

Figure 12:
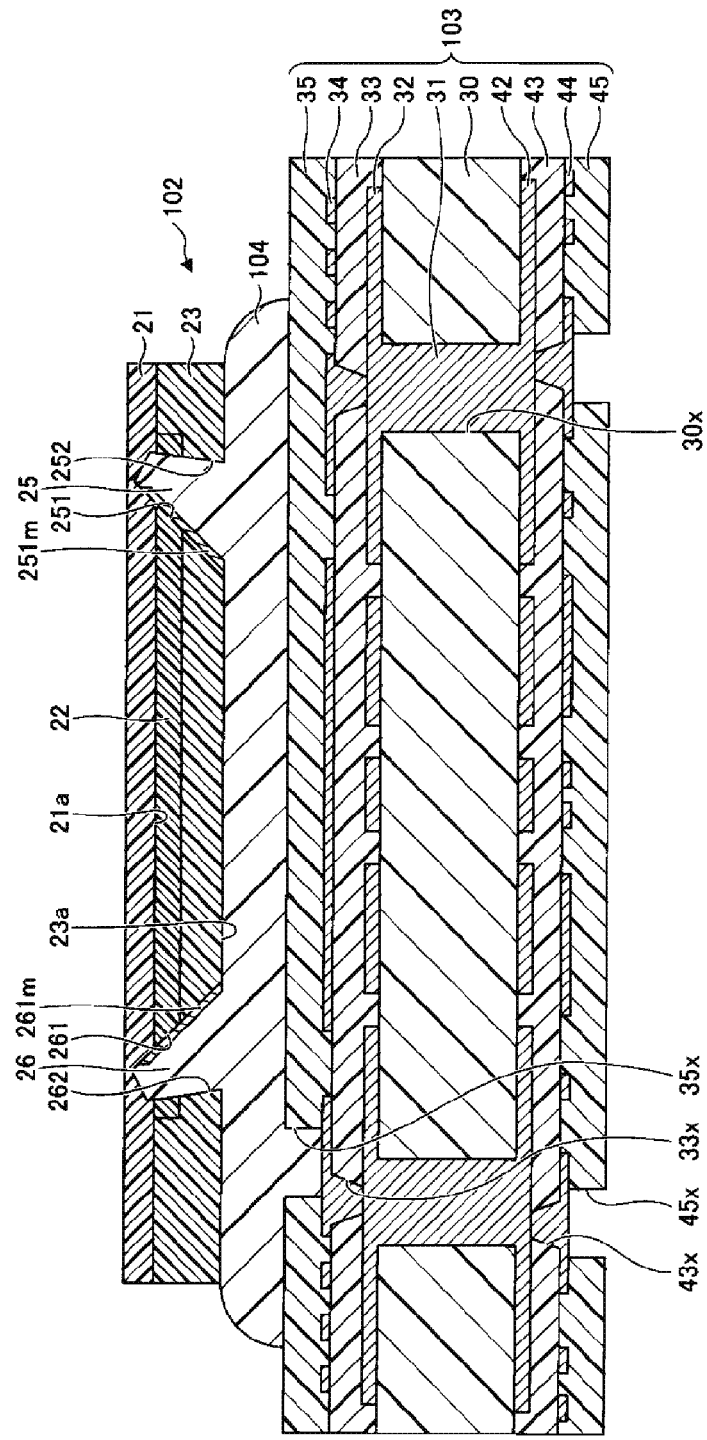
FIG. 12 is a sectional view depicting the manufacturing method of the optical waveguide mounting substrate accordance with the first exemplary embodiment (7 thereof).

Then, as shown in FIG. 12, the support member 10 is peeled off. In addition, the liquefied adhesive 53 is cured by heating, so that the adhesive layer 104 is formed.

Figure 13:
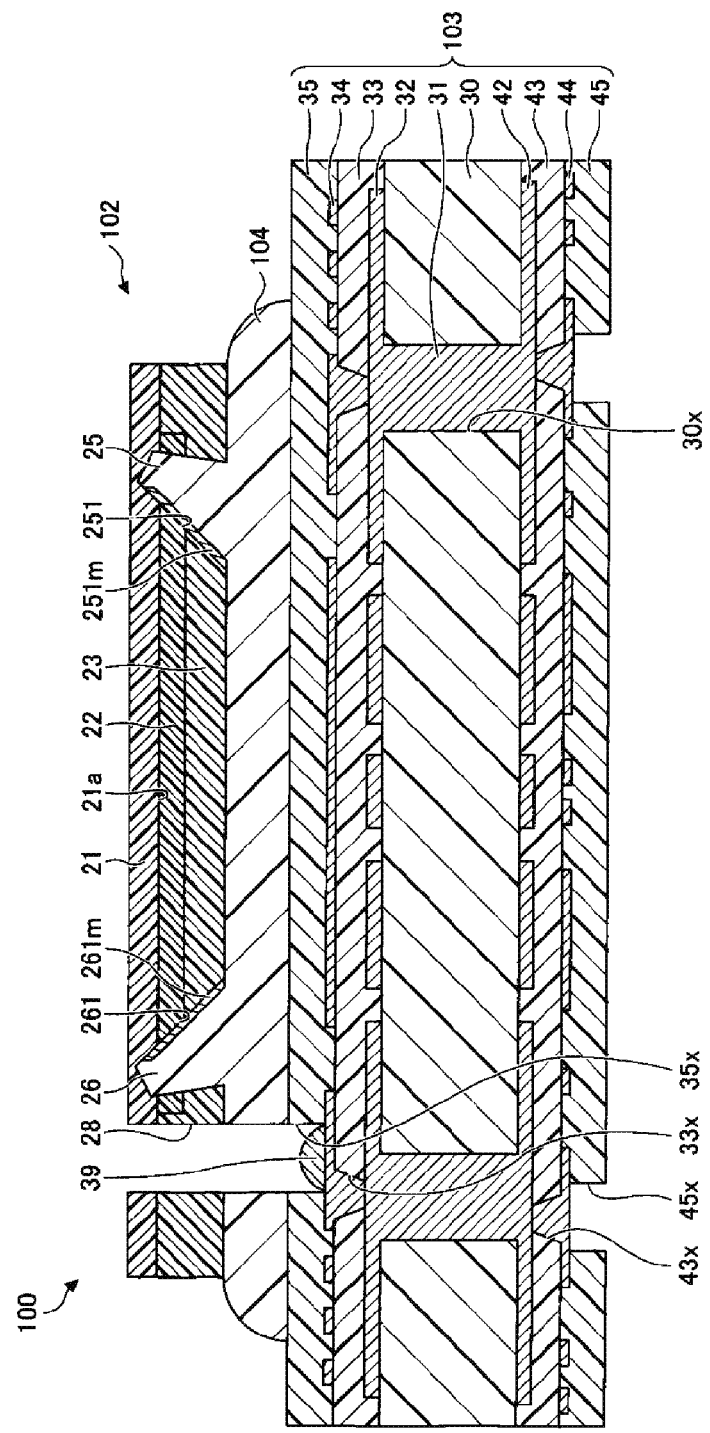
FIG. 13 is a sectional view depicting the manufacturing method of the optical waveguide mounting substrate accordance with the first exemplary embodiment (8 thereof).

Then, as shown in FIG. 13, the optical waveguide 102 and the adhesive layer 104 are formed with the openings 28 to communicate with the openings 35x of the solder resist layer 35. In the openings 35x and the openings 28 communicating with each other, one surface of the wiring layer 34 is exposed. The openings 28 may be formed by a laser processing method of using $CO_2$ laser, for example. Subsequently, the external connection terminals 39 are formed on one surface of the wiring layer 34 exposed into the openings 35x and the openings 28 communicating with each other. The external connection terminal 39 is, for example, a solder bump. The material of the solder bump is as described above.

In this way, it is possible to manufacture the optical waveguide mounting substrate 100 in accordance with the first exemplary embodiment.

According to the manufacturing method, since the openings 25 and 26 are formed by the irradiation of laser light, it is possible to accurately form one opening by one time irradiation, irrespective of alignment of the openings 25 and 26.

Figure 14:
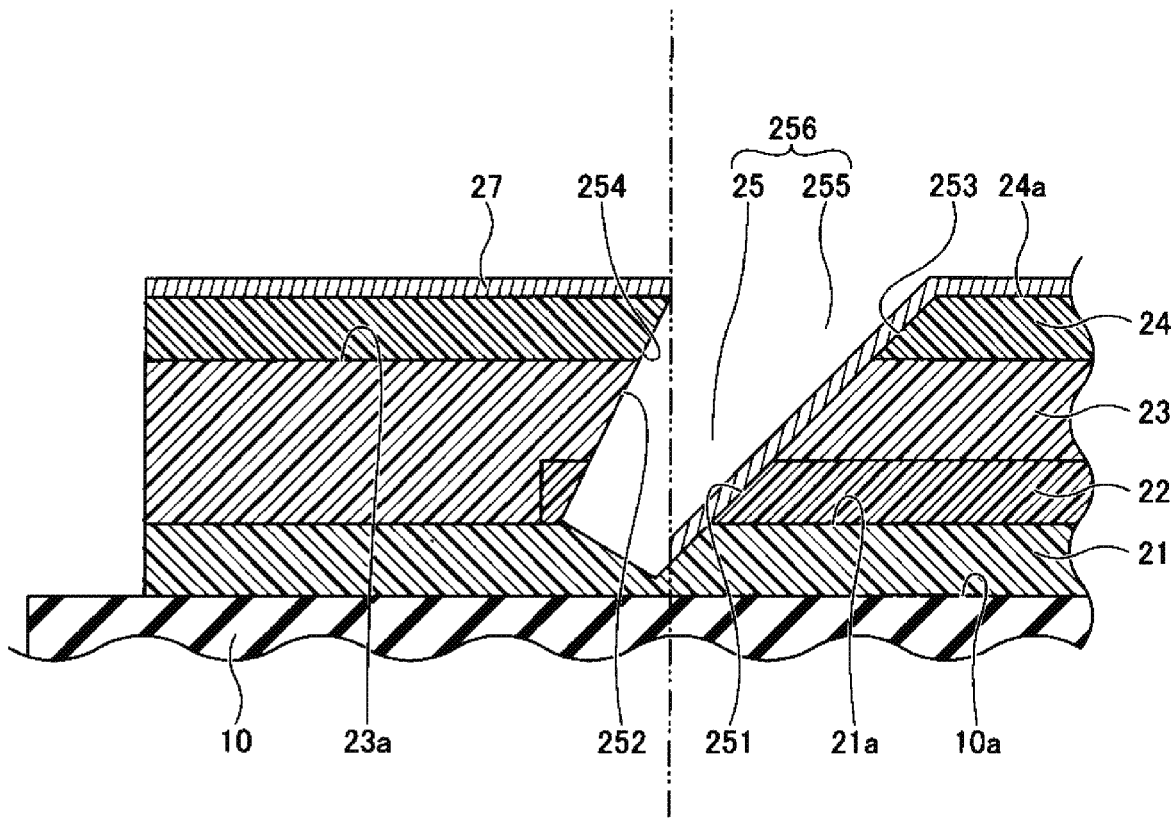
FIG. 14 is a sectional view depicting a metal film formed by a vapor deposition method.

Also, when forming the metal films 251m and 261m, the metal film 27 is formed by the vapor deposition method, so that it is possible to suppress the metal film from being formed, beyond necessity. FIG. 14 is a sectional view depicting the metal film 27 formed by the vapor deposition method. As shown in FIG. 14, when forming the metal film 27 by the vapor deposition method, the metal film 27 is not formed on a part that is covered by the protective film 24, as seen from above. For example, focusing on the opening 25, the metal film 27 is formed on the entire third inclined surface 253 and is formed on a part of the first inclined surface 251 exposed from the protective film 24, as seen from above, but is not formed on the second inclined surface 252 and the fourth inclined surface 254. This applies to the opening 26, too. If the metal film 27 is formed beyond necessity, a parasitic capacity may increase to cause variation in property, for example. However, the metal film 27 is formed by the vapor deposition method, so that the variation in property can be suppressed before happens. In the meantime, for example, if the metal film 27 is formed by the sputtering method, the metal film 27 is formed on the second inclined surfaces 252 and 262 and the like, too. Even when the metal film 27 is formed on the second inclined surfaces 252 and 262 and the like, the object of the present disclosure can be achieved. However, from a standpoint of stability of the property, the metal film 27 is preferably formed by the vapor deposition method.

Second Exemplary Embodiment

Figure 15:
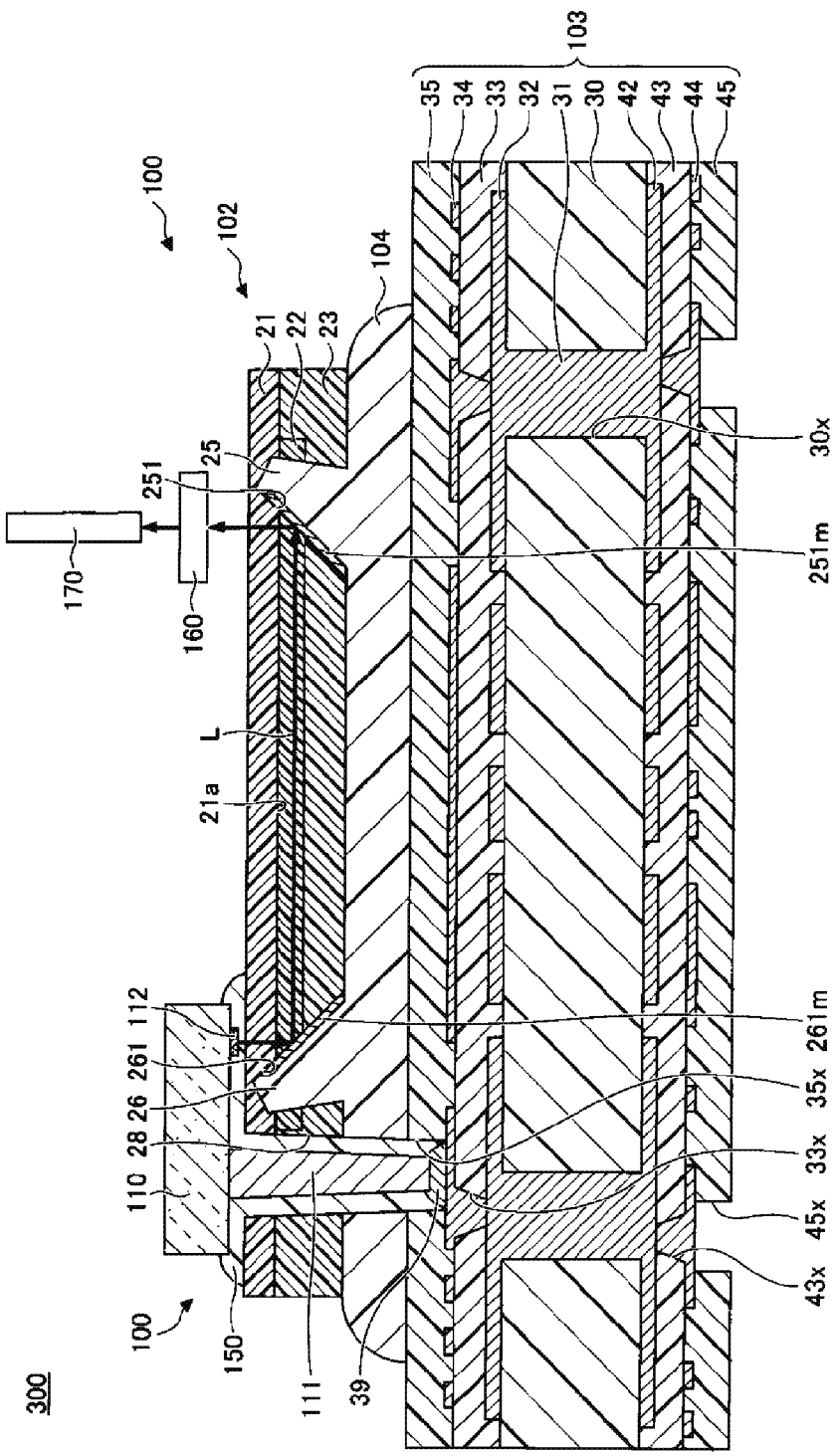
FIG. 15 a sectional view depicting an optical communication device in accordance with a second exemplary embodiment.

Subsequently, a second exemplary embodiment is described. The second exemplary embodiment relates to an optical communication device including an optical waveguide mounting substrate. FIG. 15 is a sectional view depicting an optical communication device in accordance with the second exemplary embodiment.

As shown in FIG. 15, an optical communication device 300 in accordance with the second exemplary embodiment includes the optical waveguide mounting substrate 100, a light-emitting element 110, and an under-fill resin 150.

The light-emitting element 110 includes a bump 111 and a light-emitting part 112, and is configured to emit light toward the optical waveguide 102. The bump 111 is, for example, a gold (Au) bump, is inserted into the opening 35x and the opening 28, and is electrically connected to the external connection terminal 39 exposed into the opening 35x and the opening 28. The light-emitting part 112 is arranged in a position, in which the light can be irradiated to the reflection surface that is the interface between the metal film 261m and the core layer 22. As the light-emitting element 110, for example, a planar light-emitting laser (VCSEL: Vertical Cavity Surface Emitting Laser), a light-emitting diode (LED), and the like may be used.

The under-fill resin 150 is provided in the opening 35x and the opening 28, and between the light-emitting element 110 and the solder resist layer 35. As the under-fill resin 150, for example, a light-transmittable resin through which the light emitted from the light-emitting element 110 can pass may be used.

In FIG. 15, the light L emitted from the light-emitting part 112 of the light-emitting element 110 passes through the under-fill resin 150 and the first cladding layer 21, is incident on the core layer 22, reaches the interface (reflection surface) between the core layer 22 and the metal film 261m, and is totally reflected on the reflection surface, so that a light propagation direction is converted by about 90°. Then, the light is propagated in the core layer 22, reaches the interface (reflection surface) between the core layer 22 and the metal film 251m, and is totally reflected on the reflection surface, so that the light propagation direction is converted by about 90°. Then, the light is emitted from the core layer 22, passes through the first cladding layer 21, and is emitted to an outside of the optical communication device 300.

On the emission path of the light L, for example, an optical system 160 such as a lens and an optical fiber 170 are arranged in corresponding order. Therefore, the light L is introduced into the optical fiber 170 via the optical system 160, and is transmitted by the optical fiber 170.

In the optical communication device 300, since the opening 26 does not penetrate the first cladding layer 21, it is not opened on a mounting side of the light-emitting element 110. For this reason, the under-fill resin 150 does not enter the opening 26 even when a special manufacturing process is not used. That is, when mounting the light-emitting element 110, it is possible to use the same manufacturing process as a case in which a usual semiconductor chip is mounted.

In the meantime, a light-receiving element may be provided, instead of the light-emitting element 110. In this case, a light propagation direction is a reverse direction, so that the light is introduced from the optical fiber 170 into the optical communication device 300 via the optical system 160. The light reaches the interface (reflection surface) between the core layer 22 and the metal film 251m, and is totally reflected on the reflection surface, so that the light propagation direction is converted by about 90°. Then, the light is propagated in the core layer 22, reaches the interface (reflection surface) between the core layer 22 and the metal film 261m, and is totally reflected on the reflection surface, so that the light propagation direction is converted by about 90°. Then, the light is emitted from the core layer 22, passes through the first cladding layer 21 and the under-fill resin 150, and is received by a light-receiving part of the light-receiving element provided instead of the light-emitting element 110. As the light-receiving element, for example, a photo diode, an avalanche photodiode (APD), and the like may be used.

Although the preferred exemplary embodiments have been described in detail, the present disclosure is not limited to the exemplary embodiments, and the exemplary embodiments can be diversely modified and replaced without departing from the scope of the claims.

For example, the opening 25 and the metal film 251m may not be provided, and the light L emitted from the light-emitting element 110 and propagated in the core layer 22 may be emitted from the end face of the core layer 22 to the outside of the optical communication device 300. Even in the case in which the light-receiving element is provided instead of the light-emitting element 110, the light may be made to be incident into the optical communication device 300 from the end face of the core layer 22.

Also, as the wiring substrate 103, a coreless wiring substrate manufactured by the buildup technology may be used. Also, the wiring substrate 103 is not limited thereto, and a variety of wiring substrates may be used. For example, one side (one layer) wiring substrate of which only one surface is formed with a wiring layer, a both-sided (two-layered) wiring substrate of which both surfaces are formed with wiring layers, a through-multi layered wiring substrate where the respective wiring layers are connected by through-vias, an IVH (Interstitial Via Hole) multi-layered wiring substrate where a specific wiring layer is connected by an IVH, and the like may be used.

This disclosure further encompasses various exemplary embodiments, for example, described below.

1. A manufacturing method of an optical waveguide mounting substrate, the method comprising:
    forming a first cladding layer on a support member;
    forming a core layer on a surface of the first cladding layer opposite to the support member;
    forming a second cladding layer on the surface of the first cladding layer opposite to the support member so as to cover a periphery of the core layer;
    forming an opening opened on the second cladding layer-side, penetrating the second cladding layer and the core layer, and closed on the first cladding layer-side by irradiating laser light from the second cladding layer-side;
    providing a metal film on an end face of the core layer in the opening, and
    bonding the second cladding layer to a wiring substrate via an adhesive layer and filling a part of the adhesive layer in the opening,
    wherein the end face of the core layer is inclined in a direction in which a surface of the metal film in contact with the core layer faces toward an opposite side to the wiring substrate.

2. The manufacturing method according to Claim 1, further comprising:
    forming a protective film on a surface of the second cladding layer opposite to the support member, before forming the opening, wherein the forming the opening comprises forming a second opening, which connects to the opening and exposes the end face of the core layer, as seen from above, in the protective film, and wherein the providing the metal film comprises:

forming the metal film by a vapor deposition method, and removing the protective film together with a part of the metal film on a surface of the protective film.

What is claimed is:

1. An optical waveguide mounting substrate comprising:
a wiring substrate; and
an optical waveguide mounted on the wiring substrate with an adhesive layer being interposed therebetween,
wherein the optical waveguide comprises:
a first cladding layer,
a core layer formed on a surface of the first cladding layer facing toward the wiring substrate, and
a second cladding layer formed on the surface of the first cladding layer facing toward the wiring substrate so as to cover a periphery of the core layer,
wherein an opening is opened on the second cladding layer-side, penetrating the second cladding layer and the core layer, and entirely closed on the first cladding layer-side by the first cladding layer, and a metal film is provided on an end face of the core layer in the opening,
wherein the second cladding layer faces the wiring substrate via the adhesive layer,
wherein a part of the adhesive layer is filled in the opening,
wherein the opening has a first inclined surface comprising the end face of the core layer and ranging from an opened side to a closed side, and a second inclined surface opposed to the first inclined surface and ranging from the opened side to the closed side,
wherein an angle $\theta_1$ between a surface of the second cladding layer facing toward the wiring substrate and the first inclined surface, an angle $\theta_2$ between the surface of the second cladding layer facing toward the wiring substrate and the second inclined surface, a thickness $T_1$ of the first cladding layer, a thickness $T_2$ of the core layer, a thickness $T_3$ of the second cladding layer closer to the wiring substrate than the core layer, and a width W of the opening on the opened side satisfy: a relation of $T_2+T_3<W\times\tan\theta_1$; a relation of $W\times\tan\theta_1<T_1+T_2+T_3$ is satisfied; and an absolute value of a difference between the angle $\theta_1$ and the angle $\theta_2$ is equal to or less than 40°.

2. The optical waveguide mounting substrate according to claim 1, wherein the angle $\theta_1$ is 45°±5°.

3. The optical waveguide mounting substrate according to claim 1, wherein a part on which the metal film is formed in the opening is within a range of the first inclined surface overlapping an area at an end of the opened side of the opening, as seen from above.

4. The optical waveguide mounting substrate according to claim 1, wherein the first cladding layer, the core layer and the second cladding layer are formed of polymer.

5. An optical communication device comprising:
the optical waveguide mounting substrate according to claim 1; and
at least one of a light-emitting element and a light-receiving element, the light-emitting element configured to emit light toward the optical waveguide, the light-receiving element configured to receive light emitted from the optical waveguide.

* * * * *